US008379378B2

(12) United States Patent
Visser et al.

(10) Patent No.: US 8,379,378 B2
(45) Date of Patent: Feb. 19, 2013

(54) HYBRID HINGE AND AN ELECTRONIC DEVICE COMPRISING THE HYBRID HINGE

(75) Inventors: Hendrik Dirk Visser, Eindhoven (NL); Jari Riski, Parainen (FI); Johannes Cornelis Adriaan Hamers, Breugel (NL); Michael Johannes Anna Maria Walters, Eindhoven (NL)

(73) Assignee: Creator Technology B.V., Breda (NL)

( * ) Notice: Subject to any disclaimer, the term of this patent is extended or adjusted under 35 U.S.C. 154(b) by 501 days.

(21) Appl. No.: 12/597,358

(22) PCT Filed: Apr. 25, 2008

(86) PCT No.: PCT/NL2008/050246
§ 371 (c)(1),
(2), (4) Date: May 19, 2010

(87) PCT Pub. No.: WO2008/133508
PCT Pub. Date: Nov. 6, 2008

(65) Prior Publication Data
US 2010/0246103 A1 Sep. 30, 2010

Related U.S. Application Data

(60) Provisional application No. 60/913,943, filed on Apr. 25, 2007.

(51) Int. Cl.
*G06F 1/16* (2006.01)
(52) U.S. Cl. ........... 361/679.27; 361/679.26; 361/679.3; 361/679.55; 361/679.56; 49/381; 16/221; 16/385
(58) Field of Classification Search ................... None
See application file for complete search history.

(56) References Cited

U.S. PATENT DOCUMENTS

| | | | | |
|---|---|---|---|---|
| 4,064,595 A * | 12/1977 | Leaver | ............................. | 16/234 |
| 4,452,373 A * | 6/1984 | Pearce et al. | .................. | 220/4.22 |
| 6,016,176 A * | 1/2000 | Kim et al. | ........................ | 349/84 |
| 6,262,785 B1 * | 7/2001 | Kim | .................. | 349/58 |
| 6,267,236 B1 | 7/2001 | Seok | | |
| 6,377,324 B1 * | 4/2002 | Katsura | ........................... | 349/58 |
| 6,460,221 B1 * | 10/2002 | Eromaki | ......................... | 16/286 |
| 6,577,496 B1 * | 6/2003 | Gioscia et al. | .............. | 361/679.3 |
| 6,876,876 B2 * | 4/2005 | Uhlemann | ................. | 455/575.3 |
| 7,032,984 B2 * | 4/2006 | Kim et al. | ....................... | 312/7.2 |
| 7,548,415 B2 * | 6/2009 | Kim | .......................... | 361/679.27 |
| 7,551,148 B2 * | 6/2009 | Maatta | ............................ | 345/1.3 |
| 7,787,917 B2 * | 8/2010 | Aoki et al. | ................. | 455/575.3 |
| 8,170,631 B2 * | 5/2012 | Aoki et al. | ................. | 455/575.3 |
| 8,213,167 B2 * | 7/2012 | Kim | ........................ | 361/679.26 |

(Continued)

FOREIGN PATENT DOCUMENTS

JP 08-248895 9/1996

OTHER PUBLICATIONS

International Search Report for PCT/NL2008/050246 dated Aug. 4, 2008.

(Continued)

*Primary Examiner* — Anthony Q Edwards

(57) ABSTRACT

The invention relates to a hybrid hinge. The hybrid hinges 7, 8 are used for rotatably adjoining segments S1, S2, S1 of a suitable electronic apparatus. The hybrid hinge 7, 8 comprise respective rigid hinges 2, 4 arranged to rotate the segments S1, S2, respectively S2, S1' about respective shafts 2, 4. The hybrid hinges further comprise respective elastic hinges having respective portions 3a, 3b, 3c and 5a, 5b, 5c. Preferably, a central portion 3b, 5b of the elastic hinges is arranged to coincide with the shaft 2a, 4a. More preferably, the elastic hinges are arranged to seal an interface between the segments S1, S2 and S2, S1' in the area of the rigid hinge. The invention further relates to an electronic device comprising the hybrid hinge.

10 Claims, 4 Drawing Sheets

U.S. PATENT DOCUMENTS

| | | |
|---|---|---|
| 2002/0104769 A1 | 8/2002 | Kim et al. |
| 2003/0201753 A1 | 10/2003 | Kinoshita |
| 2004/0078929 A1* | 4/2004 | Schoemann .................... 16/225 |
| 2004/0264118 A1 | 12/2004 | Karidis et al. |
| 2006/0125784 A1* | 6/2006 | Jang et al. .................... 345/156 |
| 2006/0133052 A1 | 6/2006 | Harmon et al. |
| 2008/0158795 A1* | 7/2008 | Aoki et al. .................... 361/681 |

OTHER PUBLICATIONS

China Patent office, Office Action, Patent Application Serial No. 200880021843.2, Apr. 25, 2011, China.

Japan Patent Office, Office Action, Patent Application Serial No. 2010-506100, Aug. 23, 2012, Japan.

* cited by examiner

HYBRID HINGE AND AN ELECTRONIC DEVICE COMPRISING THE HYBRID HINGE

FIELD OF THE INVENTION

The invention relates to a hybrid hinge for rotatably arranging a first segment with respect to a second segment, wherein the first segment and/or the second segment are rotatable about a shaft.

The invention further comprises an electronic device comprising the hybrid hinge.

BACKGROUND OF THE INVENTION

Hinges are widely applicable for adjoining segments, notably of an apparatus, which are conceived to be rotated with respect to each other about a shaft. Hinges between two segments can either be realized by a rigid hinge having a shaft and thereby defining a sole axis of rotation for the segments, or by a elastic hinge, also known as a living hinge or an elastic hinge. An example of the rigid hinge is a butt-hinge comprising the shaft that runs through suitable openings in the two joined segments. The living hinge is usually manufactured from a relatively thin elastic material. The elasticity of a elastic hinge gives the adjoined segments the freedom to rotate with respect to each other, however the rotation axis is not fixed. Therefore, this kind of hinge also gives some freedom for the adjoined segments in other directions than rotation alone. Deformation of the living hinge other than a direction of the rotation around the intended sole axis of an apparatus can cause damage to the apparatus, in particular to parts that bridge the hinge.

It is a disadvantage of the known rigid hinge in that it is comparatively voluminous requiring a substantial space in an apparatus. In addition, gaps are present between the displaceable segments due to the construction of the rigid hinge. It is a disadvantage of the living hinge in that it does not have a well determined axis of rotation allowing for the segments to be twisted with respect to each other.

SUMMARY OF THE INVENTION

It is an object of the invention to provide an improved hinge.

To this end the hinge according to the invention comprises a rigid hinge comprising a shaft and an elastic hinge cooperating with the rigid hinge and extending at least partially over an area of the first segment and the second segment.

The technical measure of the invention is based on the insight that by addition of the live hinge to a per se known rigid hinge an improved hinge is provided wherein the sole axis of rotation is defined by the shaft of the rigid hinge and wherein the movement of the segment with respect to each other is enabled in a smooth fashion due to elastic properties of the elastic hinge. In addition the elastic hinge adds strength to the rigid hinge, while requiring a minimum of additional space in the device.

The elastic hinge may comprise thin sections of plastic that connect two segments allowing them to be rotatable with respect to each other. The suitable materials for manufacturing elastic hinges preferably relate to a very flexible plastic, such as polypropylene and polyethylene. These materials can flex more that 1000 times without losing their elastic properties. In order to manufacture such elastic hinges the molecules of the suitable plastic have to be oriented substantially parallel to the envisaged hinge axis. Such orientation is achieved during a carefully selected moulding process, comprising the steps of flexing and coining. Due to the coining step the strain induced in the elastic hinge is greater that the yield stress of the plastic. This will result in a plastic deformation of the hinge in use. Preferably, the elastic hinge has a thickness in a range of 0.25-0.5 mm. This keeps the mechanical stress in the outer fibers from exceeding the stress when the hinge is bent. It is noted that the manufacturing of the elastic hinge may comprise a step of heating the hinge or the coining at temperatures below the glass transition temperature of the plastic for easier coining and for improving the properties of the elastic hinge.

In an embodiment of the hybrid hinge according to the invention the elastic hinge is arranged for substantially sealing an area between the first segment and the second segment. This feature is advantageous particularly for devices comprising a lid or a cover, like portable computers, mobile telephones and the like wherein the interior of the device behind the lid has to be protected from environment. Due to the fact that the segments are rotating without leaving open areas between them, the contamination of the device comprising such hybrid hinge is substantially reduced thereby increasing durability of the device. Preferably, the elastic hinge comprises a stretchable material such as, for example, polyethylene or polypropylene. It is found to be advantageous to use a bendable polymer for the elastic hinge.

In an embodiment of the hybrid hinge according to the invention, the rigid hinge is arranged inside the elastic hinge. Due to this feature the rigid hinge and the elastic hinge have a mutual axis of rotation decreasing undesired stress in the elastic hinge.

The electronic device according to the invention comprises a hybrid hinge as set forth with reference to the foregoing. In an embodiment of the electronic device according to the invention a layer of material is extended at least partially over the first segment and the second segment. Preferably, the layer of material comprises a display, notably a flexible display. In a further embodiment of the electronic device according to the invention the flexible display is arranged to be alternated between a collapsed state and a retracted state.

These and other aspects of the invention will be discussed in more detail with reference to drawings.

DETAILED DESCRIPTION

Figure 1:
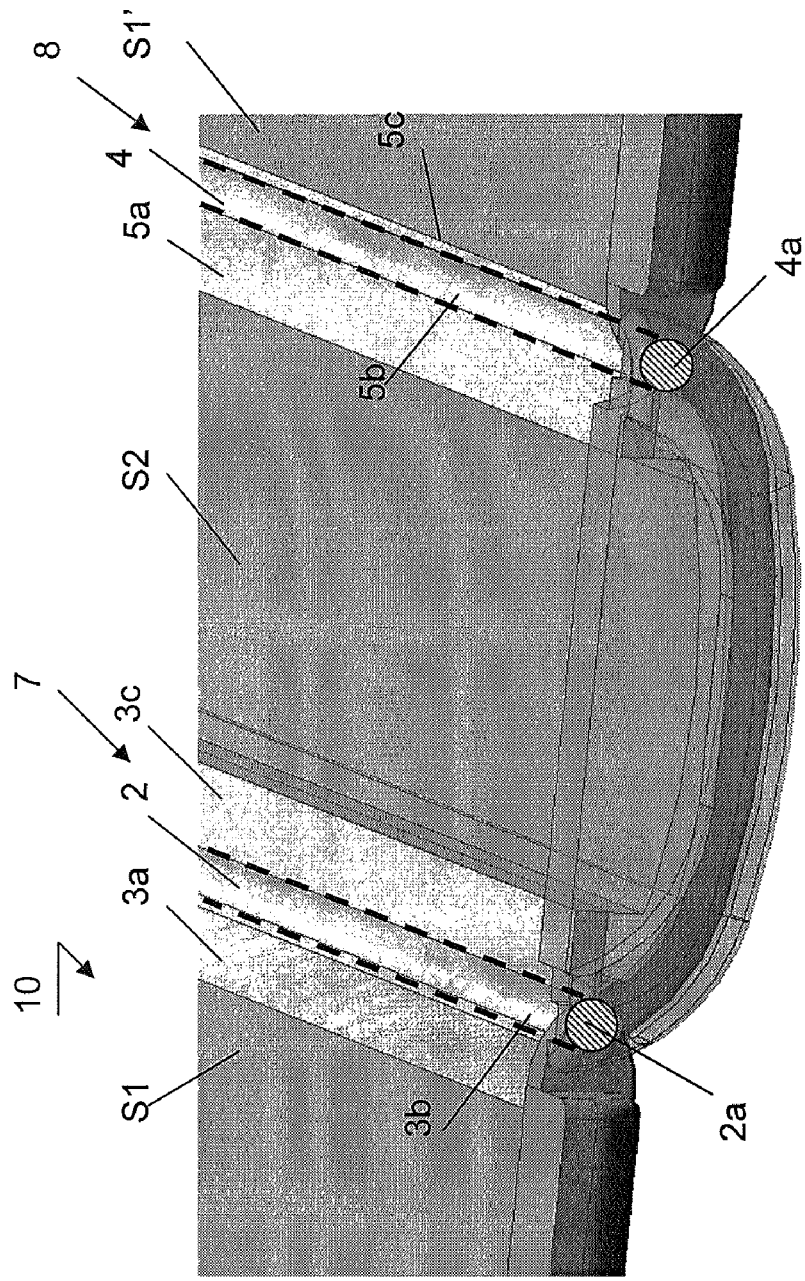
FIG. 1 presents a schematic view of an embodiment of a hybrid hinge according to the invention.

FIG. 1 presents a schematic view of an embodiment of a hybrid hinge according to the invention. In the exemplary embodiment 10 hybrid hinges 7, 8 according to the invention are used for rotatably adjoining segments S1, S2, S1' of a suitable electronic apparatus. It will be appreciated that such hinges are applicable to a great variety of electronic devices such as, for example portable computers, mobile phones, palmtop computers, electronic organizers, mobile music devices or the like. The hybrid hinge 7, 8 comprise respective rigid hinges 2, 4 arranged to rotate the segments S1, S2, respectively S2, S1' about respective shafts 2a, 4a. Preferably, the shafts 2a, 4a protrude through the whole device 10 to the outside portions. The rigid hinge may instead be arranged only at the sides of the hinge line; not necessarily protruding from the elastic hinge. The hybrid hinges further comprise respective elastic hinges having respective portions 3a, 3b, 3c and 5a, 5b, 5c. Preferably, a central portion 3b, 5b of the elastic hinges is arranged to coincide with the shafts 2a, 4a. More preferably, the elastic hinges are arranged to seal an interface between the segments S1, S2 and S2, S1' in the area of the rigid hinge. This feature enables an effective protection from dust and particle contamination from environment. This is particularly advantageous when a fragile material, like a flexible display is conceived to be supported by the segments S1, S2 and S1'. An embodiment of the electronic device comprising a flexible display will be discussed with the reference to FIG. 4.

Figure 2:
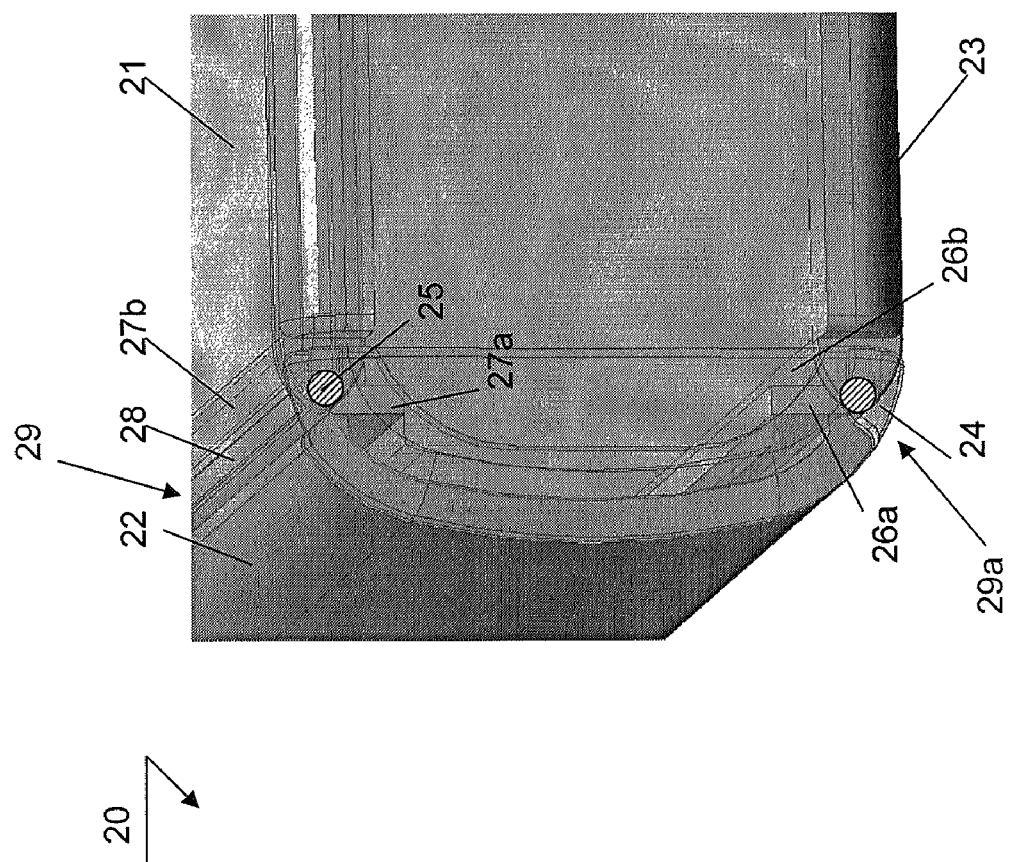
FIG. 2 presents a schematic view of the embodiment of FIG. 1 in a closed state.

FIG. 2 presents a schematic view of the embodiment of FIG. 1 in a closed state. A suitable device, notably an electronic device comprises segments 21, 22, 23 interconnected by respective hybrid joints 29, 29a according to the invention. The hybrid joint 29 comprises a rigid hinge 25, 24 and an elastic hinge with portions 27a, 27b, respectively 26a, 26b. It is noted that the elastic hinge is arranged to alternate between a substantially flat position, as is schematically indicated in FIG. 1, and a bent position as is schematically shown in FIG. 2. By selecting a bendable plastic material, like polypropylene, polyethylene or any elastomer, such alternations may be enabled without causing any damage to the elastic hinge. Preferably, to minimize stress to the material of the elastic hinge, the rigid hinge is positioned in line with the elastic hinge so that their respective axis of rotation coincide.

Figure 3:
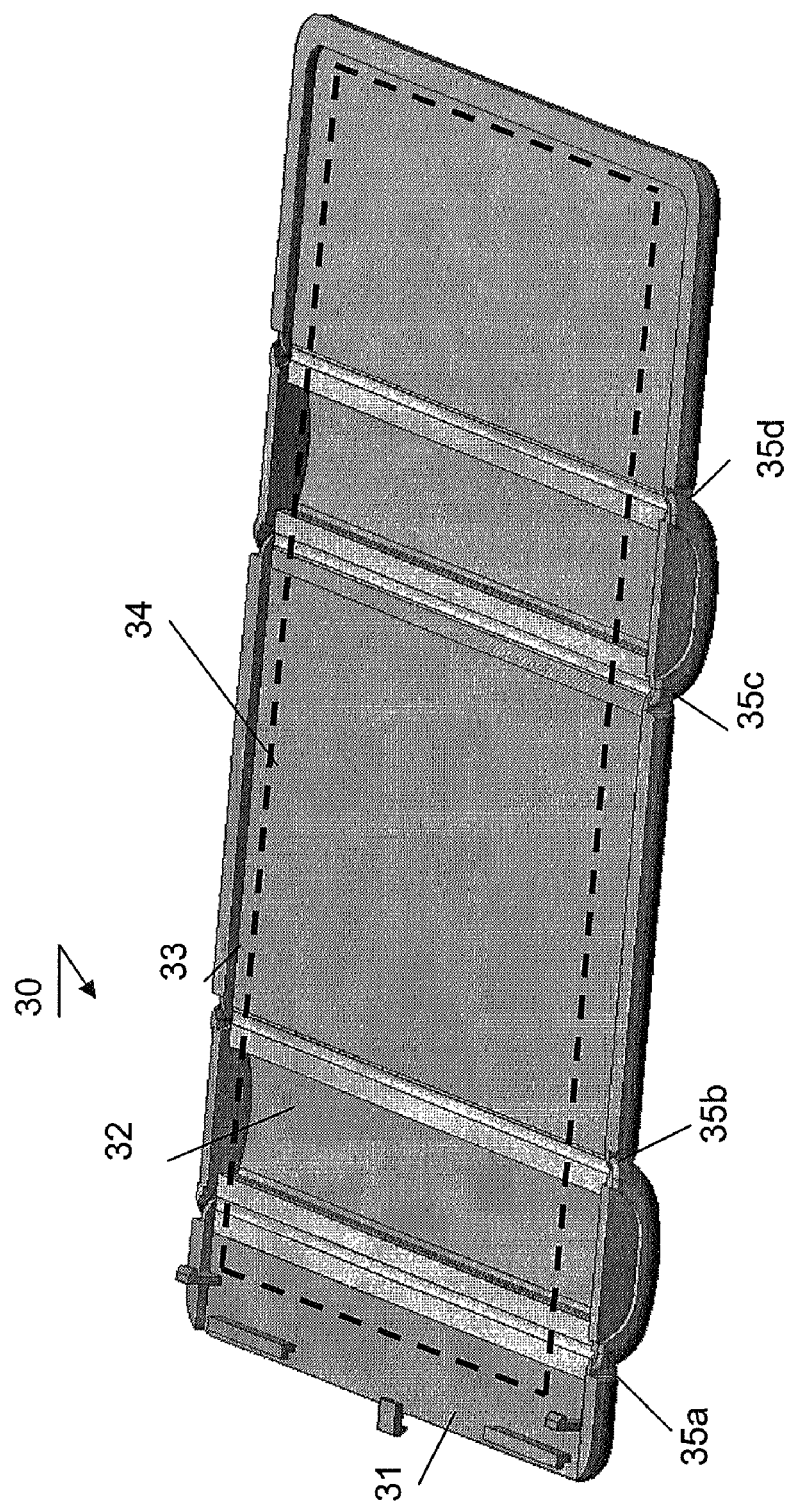
FIG. 3 presents a schematic view of an embodiment of a part of the electronic device according to the invention.

FIG. 3 presents a schematic view of an embodiment of a part of the electronic device according to the invention. The electronic device 30 comprises a housing 31 arranged for supporting a layer of a material 34, notably a flexible display. The electronic device 30, for example a' portable telephone, comprises a plurality of hybrid hinges 35a, 35b, 35c, 35d arranged at each interface between two segments such as, like segments 31, 32, conceived to be rotatably displaced with respect to each other. Due to provision of the hybrid hinge according to the invention the opening and closing of the cover of the electronic device 30 is enabled in a smooth way protecting the layer 34 from a mechanical shock due to abrupt opening or closing of the cover. In case when the elastic hinge (not shown) is arranged to expand in the area of the interface between the segments thereby covering or sealing the interface, the layer 34 is effectively protected from undesirable influence of the environment, like contamination particles. It is noted that even a substantial protection against humidity may be envisaged due to such sealing.

Figure 4:
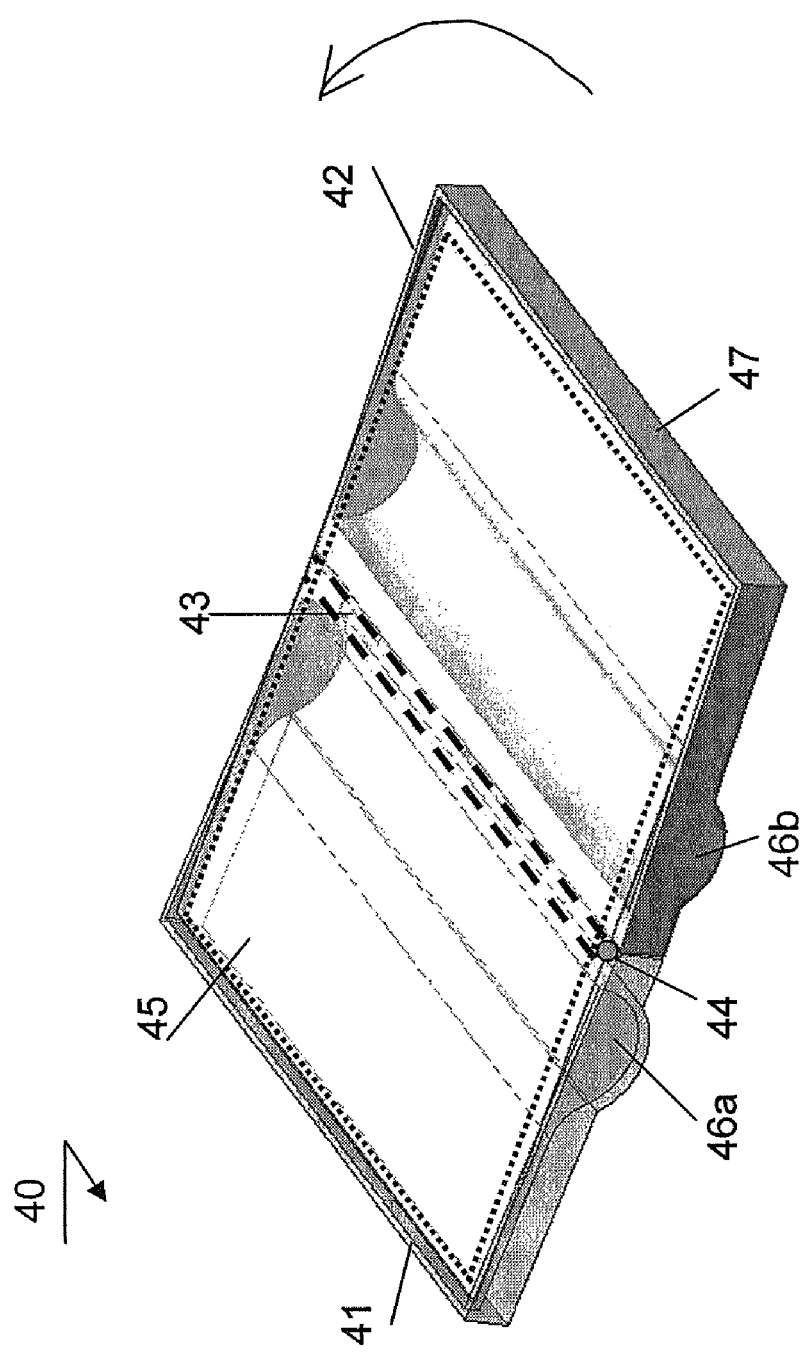
FIG. 4 presents a schematic view of a further embodiment of the electronic device according to the invention.

FIG. 4 presents a schematic view of a further embodiment of the electronic device according to the invention. In this particular embodiment an electronic apparatus 40 comprising a flexible display 45 is shown, said apparatus 40 being arranged to be book-shaped. The electronic apparatus 40 comprises a cover 47 which is arranged to provide a suitable support to the flexible display 45 and to protect the display area from damage. The respective segments 41, 42 of the book-shaped electronic device are interconnected by the hybrid hinge 44 according to the invention, said hinge enabling a rotation of the segments 41, 42 about the axis 43. In order to prevent damage of the flexible display due to folding, the cover 47 comprises cavities 46a, 46b arranged for receiving a portion of the flexible display 45 when the electronic device 40 is closed. In case when the elastic hinge (not shown) is arranged to expand in the area of the interface between the segments 41, 42 thereby sealing the interface, the flexible display 45 is effectively protected from undesirable influence of the environment, like contamination particles. It is noted that even a substantial protection against humidity may be envisaged due to such sealing. Also, the fact that the elastic hinge is present sealing the space between the segments 41, 42, extra mechanical strength to the hybrid hinge is provided. This is of particular importance when the hybrid hinge is to cooperate with a fragile structure posing specific requirements onto suitable support means. Thus, when the rigid hinge is being positioned so that the segments 41, 42 do not form a flat structure, the openings in the rigid hinge are protected by the elastic hinge preventing the underlying fragile structure, notably a flexible display, from mechanical damage.

It is noted that it is desirable that the length of the display stays substantially the same during opening and closing of the electronic device 40. To achieve this the hinge is to be positioned as close as possible to the plane of the display 45, preferably in the plane of the display 45. The rigid hinge due to its dimension can only be positioned near the plane of the flexible display 45. This means that the axis of the hinge is weak. This disadvantage is solved by providing the elastic hinge wherein the rigid hinge is cooperating with the elastic hinge. Although it is shown in FIG. 4 that the axis of the elastic hinge coincides with the axis of the rigid hinge, this may not be explained limitative, as it is also possible to arrange the elastic hinge being spaced apart from the rigid hinge.

Preferably, in case when the display is arranged to be pivoted at least in a first region and in a second region, the elastic hinge is arranged to extend between the said at least the first region and the second region. Due to this feature an additional protection of the back surface of the display is achieved. This is implemented when at least one of the pivotable areas comprises a hybrid hinge comprising a rigid hinge and an elastic hinge, the elastic hinge extending to the second hinge in the second region. More preferable, the first region and the second region comprise the elastic hinge.

It will be appreciated that although specific embodiments of the electronic device according to the invention are discussed separately for clarity purposes, interchangeability of compatible features discussed with reference to isolated figures is envisaged. While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. An electronic device, comprising:
   a display having a first segment and a second segment;
   a rigid hinge comprising a shaft; and
   an elastic hinge disposed between the display and the rigid hinge, wherein the elastic hinge cooperates with the rigid hinge and extends at least partially over an area of the first segment and the second segment, wherein the first segment and the second segment are rotatable about the shaft.

2. The electronic device according to claim 1, wherein the elastic hinge is arranged for substantially sealing an area between the first segment and the second segment.

3. The electronic device according to claim 2, wherein the elastic hinge comprises a stretchable material.

4. The electronic device according to claim 1, wherein the elastic hinge comprises a bendable polymer.

5. The electronic device according to claim 1, wherein the rigid hinge is arranged inside the elastic hinge.

6. An electronic device, comprising:
a display having a first segment, a second segment, and a third segment;
a housing forming a cavity for receiving the second segment;
a first hinge module having a first rigid hinge and a first elastic hinge, wherein the first rigid hinge comprises a first shaft, and the first elastic hinge cooperates with the first rigid hinge and extends at least partially over an area of the first segment and the second segment, wherein the first segment and the second segment are rotatable about the first shaft; and
a second hinge module having a second rigid hinge and a second elastic hinge, wherein the second rigid hinge comprises a second shaft, and the second elastic hinge cooperates with the second rigid hinge and extends at least partially over an area of the second segment and the third segment, wherein the second segment and the third segment are rotatable about the second shaft.

7. The electronic device according to claim 6, wherein the first elastic hinge is arranged for substantially sealing an area between the first segment and the second segment, and the second elastic hinge is arranged for substantially sealing an area between the second segment and the third segment.

8. The electronic device according to claim 7, wherein the first and second elastic hinges respectively comprise a stretchable material.

9. The electronic device according to claim 6, wherein the first and second elastic hinges respectively comprise a bendable polymer.

10. The electronic device according to claim 6, wherein the first rigid hinge is arranged inside the first elastic hinge, and the second rigid hinge is arranged inside the second elastic hinge.

* * * * *